US010614656B2

(12) United States Patent
Shigeta

(10) Patent No.: US 10,614,656 B2
(45) Date of Patent: Apr. 7, 2020

(54) TABLE GAME MANAGEMENT SYSTEM AND DISPOSAL CARTON

(71) Applicant: ANGEL PLAYING CARDS CO., LTD., Shiga (JP)

(72) Inventor: Yasushi Shigeta, Shiga (JP)

(73) Assignee: ANGEL PLAYING CARDS CO., LTD., Shiga (JP)

( * ) Notice: Subject to any disclaimer, the term of this patent is extended or adjusted under 35 U.S.C. 154(b) by 0 days.

(21) Appl. No.: 16/062,744

(22) PCT Filed: Dec. 9, 2016

(86) PCT No.: PCT/JP2016/086813
§ 371 (c)(1),
(2) Date: Jun. 15, 2018

(87) PCT Pub. No.: WO2017/104582
PCT Pub. Date: Jun. 22, 2017

(65) Prior Publication Data

US 2019/0221070 A1 Jul. 18, 2019

(30) Foreign Application Priority Data

Dec. 15, 2015 (JP) ................................ 2015-257794

(51) Int. Cl.
*G06F 17/00* (2019.01)
*G07F 17/32* (2006.01)

(52) U.S. Cl.
CPC ........ *G07F 17/322* (2013.01); *G07F 17/3223* (2013.01); *G07F 17/3293* (2013.01)

(58) Field of Classification Search
None
See application file for complete search history.

(56) References Cited

U.S. PATENT DOCUMENTS 2,240,828 A * 5/1941 Behles ............... B65D 5/48026 217/30
4,860,888 A * 8/1989 Keith .................. B65D 5/4233 206/223

(Continued)

FOREIGN PATENT DOCUMENTS

AU 2014201757 A1 10/2015
EP 2849860 A1 3/2015

(Continued)

OTHER PUBLICATIONS

Australian application No. 2016371880, Examination Report No. 1 dated Jan. 31, 2019.

(Continued)

*Primary Examiner* — Paul A D'Agostino
(74) *Attorney, Agent, or Firm* — Norton Rose Fulbright US LLP

(57) ABSTRACT

There is provided a system for managing a table game in which management for which cards are certainly discarded after being used without being dispersed in a unit of packages in which they are packaged is realized in a unit for cartons for discard. The system for managing a table game according to the present invention stores information on carton IDs read by an ID card reader, and a moving apparatus (700) of the carton (600) for discard for accepting discarded cards (3) in different areas (600A) in a unit of packages is provided below an outlet (4) of a game table (2). The moving apparatus (700) is provided with an X-Y table (701) moving the carton (600) for discard in an X-Y direction (shown in FIG. 5), and the carton (600) for discard is mounted and fixed on the X-Y table (701).

33 Claims, 12 Drawing Sheets

(56) References Cited

U.S. PATENT DOCUMENTS

| | | | | |
|---|---|---|---|---|
| 5,082,113 | A * | 1/1992 | Romick | A61J 1/035 206/459.1 |
| 5,626,284 | A * | 5/1997 | Franzen | B65D 5/48038 229/120.36 |
| 5,785,239 | A * | 7/1998 | Campbell, II | B65D 5/48038 217/22 |
| 6,910,582 | B2 * | 6/2005 | Lantz | B65D 5/48038 206/438 |
| 9,266,011 | B2 * | 2/2016 | Johnson | A63F 1/12 |
| 9,345,952 | B2 * | 5/2016 | Blaha | A63F 1/12 |
| 9,524,618 | B2 * | 12/2016 | Shigeta | A63F 1/06 |
| 9,539,494 | B2 * | 1/2017 | Sines | A63F 1/12 |
| 9,566,501 | B2 * | 2/2017 | Stasson | A63F 1/12 |
| 10,130,867 | B2 * | 11/2018 | Shigeta | G07F 17/3241 |
| 10,238,955 | B2 * | 3/2019 | Shigeta | A63F 1/067 |
| 10,279,245 | B2 * | 5/2019 | Sampson | A63F 1/12 |
| 2002/0068635 | A1 * | 6/2002 | Hill | A63F 1/14 463/47 |
| 2009/0253503 | A1 | 10/2009 | Krise et al. | |
| 2010/0314830 | A1 | 12/2010 | Grauzer et al. | |
| 2011/0130185 | A1 * | 6/2011 | Walker | A63F 1/14 463/13 |
| 2013/0292902 | A1 * | 11/2013 | Shigeta | A63F 1/02 273/148 R |
| 2013/0307215 | A1 | 11/2013 | Shigeta | |
| 2014/0033660 | A1 | 2/2014 | Shigeta | |
| 2015/0283453 | A1 | 10/2015 | Miller | |
| 2017/0106270 | A1 | 4/2017 | Shigeta | |
| 2018/0050262 | A1 * | 2/2018 | Shigeta | A63F 1/06 |
| 2019/0118072 | A1 * | 4/2019 | Shigeta | A63F 1/12 |

FOREIGN PATENT DOCUMENTS

| | | | |
|---|---|---|---|
| JP | 2006189957 | A | 7/2006 |
| JP | 2014-031217 | A | 2/2014 |
| JP | 2015-517826 | A | 6/2015 |
| JP | 2015-181948 | A | 10/2015 |
| WO | 2013/172038 | A1 | 11/2013 |
| WO | 2015110023 | A1 | 7/2015 |
| WO | 2015/145499 | A1 | 10/2015 |

OTHER PUBLICATIONS

Canadian Office Action dated Apr. 29, 2019 in corresponding CA application No. 3008597.

European Search Report dated Jul. 3, 2019 in corresponding EP application No. 16875562.7.

Singaporean Office Action dated Aug. 29, 2019 in corresponding SG application No. 11201805131P.

* cited by examiner

TABLE GAME MANAGEMENT SYSTEM AND DISPOSAL CARTON

CROSS-REFERENCE TO RELATED APPLICATIONS

This application is a national phase application under 35 U.S.C. § 371 of International Application No. PCT/JP2016/086813 filed Dec. 9, 2016, which claims priority to Japanese Patent Application No. 2015-257794 filed Dec. 15, 2015; the entire contents of each is specifically incorporated by reference herein without disclaimer.

TECHNICAL FIELD

The present invention relates to a system for managing a table game having a function of managing used cards so as to be certainly discarded in order to prevent the used cards from being illegally taken out in a card game, and more particularly, to a system for managing a table game capable of managing used cards in a unit of cartons in which packages are accepted or in a unit of a plurality of packages.

BACKGROUND ART

In a game table, it is conceivable to do a fraud act of secretly changing cards during a game to make the game advantageous for oneself. One of the prevention apparatuses of this kind of fraud is disclosed in WO 2013/172038 A. In this literature, the prevention apparatus determines whether or not the number of cards appearing in a table game and the number of cards used in each game coincide with each other. The cards appearing in the table game are thrown into an outlet, void holes or cutouts are attached to the used cards, and voided cards are accepted and discarded in a card carton for discard (Patent Literature 1). Further, in this literature, the prevention apparatus confirms whether cards (for example, 416 cards of 52 cards×8 decks when 8 decks are used) corresponding to a predetermined number of decks accepted in a dealing shoe on the game table exist, and puts and discards these cards into a carton for discard in a unit of packages (for example, 416 cards of 8 decks) in which cards are packaged.

However, in this literature, the carton for discard is not particularly managed. In addition, the cards are discarded in the unit of the packages in which the cards are put.

CITATION LIST

Patent Literature

Patent Literature 1: WO 2013/172038 A

SUMMARY OF INVENTION

Technical Problem

When the apparatus according to the related art confirms whether the cards (for example, 416 cards of 52 cards×8 decks when 8 decks are used) of the predetermined number of decks accepted in the dealing shoe on the game table exist, and puts and discards these cards in the carton for discard, the carton for discard is not particularly managed. In addition, since the cards are discarded in the unit of the packages in which the cards are put, the number of cartons for discard that should be originally discarded is increased, such that management of the cartons is not sufficient and locations of the cartons becomes unknown.

The present invention has been made under such a background, and an object of the present invention is to provide a system for managing a table game having a structure in which cards discarded in a unit of packages in which the cards are packaged are managed based on shuffle card IDs of the packages in the unit of the packages that the cards enter, carton IDs for discard are generated in a unit of cartons for discard including a plurality of areas accepting the cards, and the carton IDs for discard are managed in association with shuffle card IDs of packages accepting discarded cards, such that management for whether or not cards are certainly discarded after being used without being dispersed in the unit of the packages in which they are packaged is realized in the unit of the cartons.

Solution to Problem

To solve the conventional problems, a system for managing a table game according to the present invention includes:

packages in which shuffled cards of a predetermined number of decks are packaged;

an ID code reader that reads the shuffle card IDs attached to the packages;

a management control apparatus that stores information on the shuffle card IDs of the packages read by the ID code reader; and a carton for discard that accepts and discards cards of a predetermined number of decks distributed onto a game table by a dealing shoe accepting cards of the predetermined number of decks taken out from the packages, used in a game, and then thrown into an outlet of the game table, wherein different and unique shuffle card IDs are attached to each package, the carton for discard has a plurality of areas and has a structure in which the areas sequentially accept the thrown cards and areas different for each package accept all of the cards corresponding to one set of the package, and the management control apparatus has a function of storing shuffle card IDs of packages in which cards used in the game and then discarded are packaged and information on a sequence of packages accepted in the carton for discard or addresses of areas in which used cards of the corresponding packages are discarded in association with each other and transmitting them.

Furthermore, the system for managing a table game described above may further include:

a game monitoring apparatus that monitors a proceeding situation of the game performed on the game table using cameras;

an image analyzing apparatus that analyzes images obtained by the cameras; and an image determining apparatus that inspects whether or not the cards are brought to the outlet using analysis results of the game monitoring apparatus and the image analyzing apparatus, wherein the image determining apparatus has a function of determining whether or not the cards distributed from the dealing shoe, used in the game, and then collected are brought to the outlet, determining whether or not the cards remaining without being used are brought to the outlet, and determining whether or not the cards remaining on the table and in the dealing shoe do not exist, using the analysis results of the game monitoring apparatus and the image analyzing apparatus, and transmitting an error signal to the management control apparatus at the time of determining an abnormality in each determination.

To solve the conventional problems, a carton for discard according to the present invention accepts and discards cards of a predetermined number of decks distributed on a game table by a dealing shoe accepting cards of the predetermined number of decks taken out from packages in which shuffled cards of a predetermined number of decks are packaged, distributed onto a game table by a dealing shoe accepting cards of the predetermined number of decks, used in a game, and the thrown into an outlet of the game table, wherein the carton for discard has a plurality of areas and has a structure in which the areas sequentially accept the thrown cards and predetermined areas for each package accept all of the cards corresponding to one set of the package, card accepting holes sequentially accepting the discarded cards from the outlet of the game table are provided in an upper portion of the carton for discard, and have a dimension set to be too small to insert a hand from the card accepting holes, and an area accepting the cards in the carton for discard is divided into a plurality of areas in any one or both of longitudinal and transverse directions, and cards corresponding to one package are accepted in the plurality of areas, respectively, such that cards of a plurality of packages are independently accepted, respectively.

In the carton for discard, printed-out ID information on shuffle card IDs of packages in which cards used in the game and then discarded are packaged is attached to or accepted in the respective areas of the carton for discard or package IDs attached to packages of cards discarded in corresponding areas are cut, and inserted and stored into the respective areas of the carton for discard.

Furthermore, the carton for discard according to the present invention may be configured such that wherein the carton for discard is moved by a moving apparatus of the carton for discard for accepting the discarded cards from the outlet of the game table in different areas in a unit of the packages or a distributing apparatus for accepting the discarded cards from the outlet of the game table in different areas in a unit of the packages, such that only cards corresponding to one package are accepted in the respective areas.

Advantageous Effects of Invention

The system for managing a table game according to the present invention has a structure in which cards discarded in a unit of packages in which the cards are packaged are managed based on shuffle card IDs of the packages in the unit of the packages that the cards enter, carton IDs for discard are generated in a unit of cartons for discard including a plurality of areas accepting the cards, and the carton IDs for discard are managed in association with shuffle card IDs of packages accepting discarded cards, such that cards are managed in the unit of the cartons for discard without being dispersed in the unit of the packages in which they are packaged. Therefore, management for whether or not the cards that correspond to a plurality of packages and should be discarded are certainly discarded after being used is realized in the unit of the cartons. As a result, management for whether or not all of the cards of the packages are discarded after being used can be performed.

DESCRIPTION OF EMBODIMENTS

Figure 1:
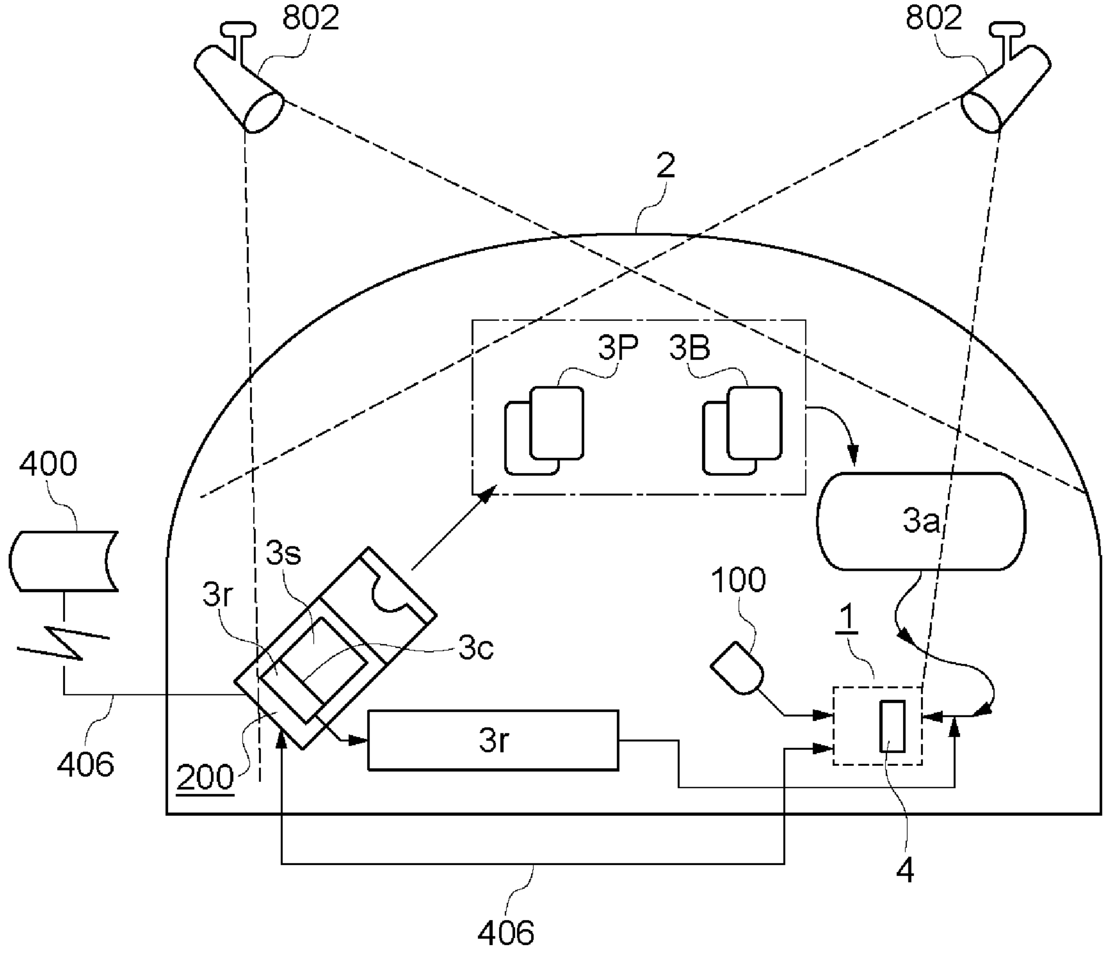
FIG. 1 is a schematic plan view showing a system for managing a table game according to an embodiment of the present invention.

Embodiments of the present invention will be described. First, an outline of an operation of a card discarding apparatus provided with a carton for discard for discarding cards after being used in a game, which is used in a system for managing a table game according to the present invention, will be described with reference to the drawings. In FIG. 1, a card discarding apparatus 1 used in the system for managing a table game according to the present invention includes a carton for discard to be described below, and is installed on a game table 2 or is disposed on a side surface of the game table 2. The game table 2 shown in FIG. 1 is shown in a simplified form, and is for a general baccarat game. As well known, the baccarat game is a game of which win/loss is determined by the sum of the numbers of ranks of cards distributed to a player 3P and a banker 3B. The game table 2 is provided with a dealing shoe 200. The dealing shoe 200 is a supply source of cards 3, and the cards 3 taken out from the dealing shoe 200 are distributed to the player 3P and the banker 3B. After the game ends, the cards 3 are discarded by the card discarding apparatus 1 to prevent the cards 3 from unauthorized use. The card discarding apparatus 1 is a card discarding apparatus discarding the cards 3 accepted in the dealing shoe 200 placed on the game table 2 and manually distributed onto the game table 2 by a dealer, or the like, after the cards are used in the game, and discards sets of cards 3 of a plurality of decks (generally 6, 8 or 12 decks) accepted in the dealing shoe 200 and collected cards 3*a*.

Figure 2:
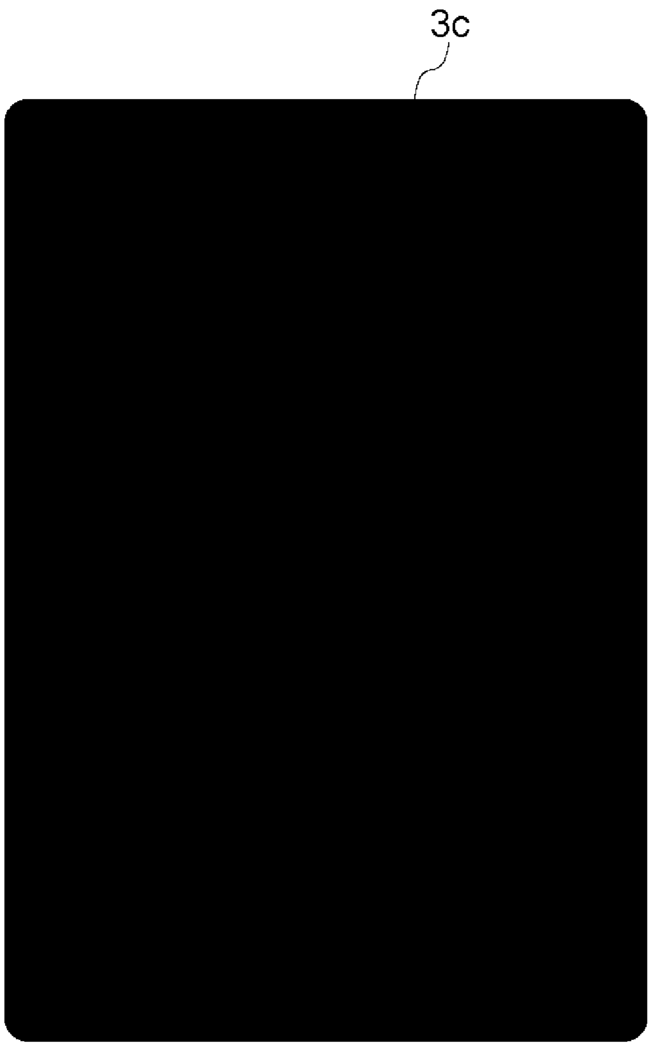
FIG. 2 is a plan view of a cut card according to the embodiment of the present invention.

Before sets 3*s* of the cards 3 are set on the dealing shoe 200 of the game table 2, a cut card 3*c* (shown in FIG. 2) is inserted into the sets 3*s* of the cards 3. When the sets 3*s* of the cards 3 are used in the game, the cut card 3*c* is inserted into the latter half portion (the remainders are about ¼ or ⅕) of the sets 3*s* of the cards 3, and is used to end the game of the game table 2 in a state in which about twenty to forty cards 3 remain in the dealing shoe 200, in order to prevent a case in which ranks of the respective cards distributed during the game are counted by the player, such that ranks of few remaining cards are predicted.

The card discarding apparatus 1 has a structure in which it can sequentially accept the cards 3*a* used in each game and then collected and can accept all of the remaining cards 3*r* in the dealing shoe 200 without being used at a predetermined timing after the cut card 3*c* drawn out from the dealing shoe 200 (when the game is stopped after the next game or 2 or 3 games after the cut card 3*c* is drawn out). The card discarding apparatus 1 has a function of determining whether or not all of the discarded cards correspond to a predetermined number of decks by aggregatively counting the number of cards 3*a* after being used in each game by a deck inspecting means to be described below and the number of remaining cards 3*r* in the dealing shoe 200 without being used after the cut card 3*c* comes out from the dealing shoe 200.

Figure 3:
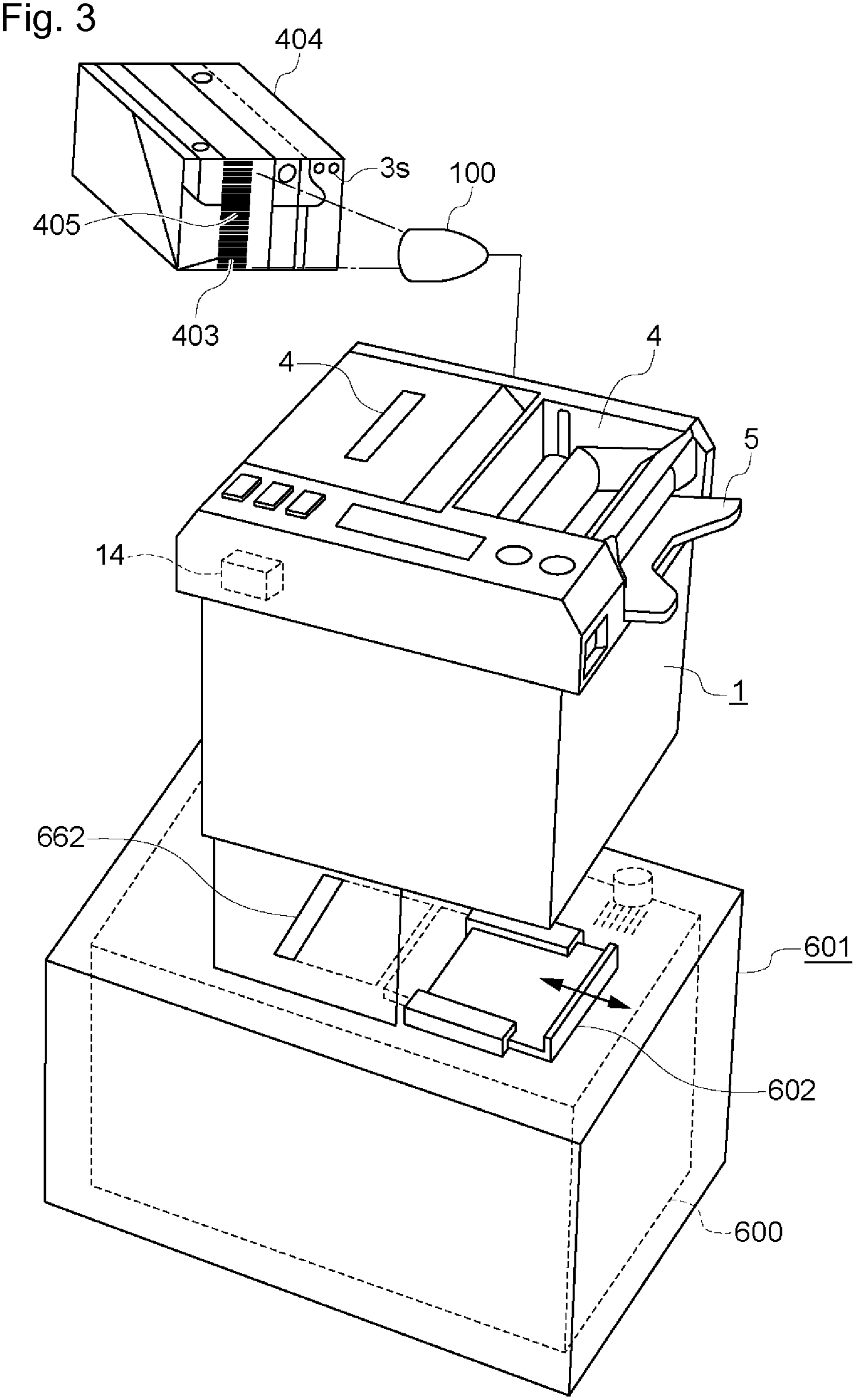
FIG. 3 is a perspective view of a carton cabinet for discard and a card discarding apparatus of the system for managing a table game according to the embodiment of the present invention.

Next, the system for managing a table game will be described in detail with reference to FIG. 3. The cards 3 used in the game in the system for managing a table game are used in a unit of packages 404 in which shuffled cards of a predetermined number of decks are packaged, and shuffle card IDs 405 are attached to these packages 404. The shuffle card IDs 405 are unique IDs different for each package 404. The shuffle card IDs 405 are attached to the packages 404 in a form of barcodes 403. The system for managing a table game includes an ID code reader 100 capable of reading the shuffle card IDs 405. The cards 3 used in the game and becoming targets to be discarded are inserted into an outlet 4 of the card discarding apparatus 1, and are then accepted and discarded in a carton 600 for discard. The outlet 4 may be provided directly in the game table 2. In addition, the system for managing a table game includes a management control apparatus 14 storing information on the shuffle card IDs 405 of the packages 404 read by the ID code reader 100, and the carton 600 for discard for accepting and discarding cards 3 of a predetermined number of decks distributed onto the game table 2 by the dealing shoe 200 accepting cards of a predetermined number of decks taken out from the packages 404, used in the game, and then thrown into the outlet 4 of the game table 2. The carton 600 for discard includes a plurality of areas 600A as described below, and has a structure in which the areas 600A sequentially accept the thrown cards and areas 600A different for each package can accept all of the cards corresponding to one set of the package. The management control apparatus 14 has a function of storing the shuffle card IDs 405 of the packages 404 in which the cards used in the game and then discarded are packaged and information on a sequence of the packages 404 accepted in the carton 600 for discard or addresses of areas 600A in which used cards of the corresponding packages 404 are discarded in association with each other and transmitting them (detailed contents will be described below).

The card discarding apparatus 1 includes a discarded card cradle 5 accepting the target card 3*a* to be discarded from the outlet 4. The card discarding apparatus 1 includes the management control apparatus 14 controlling all operations, and the management control apparatus 14 controls the respective operations. The management control apparatus 14 includes an electronic circuit including a microcomputer, a memory, and the like, and has a configuration of a general computer such as a central processing unit (CPU), a read only memory (ROM), a random access memory (RAM), and the like. The management control apparatus 14 controls the entire apparatus by executing a program stored in a ROM or other memory, and performs necessary processing. A take-out roller (not shown) for taking out the cards 3 which are placed by a hand on the discarded card cradle 5 and is discarded one by one is provided below the discarded card cradle 5, and when the cards 3 are placed on the discarded card cradle 5, the management control apparatus 14 controls a driving motor, and the like, to take out the cards 3 existing on the discarded card cradle 5 by the take-out roller and certainly send the cards 3 to the carton 600 for discard. The sent cards 3 passes through a group information acquisition sensor (not shown) and two card information acquisition sensors (not shown) during being sent, and information one the cards 3 is detected and acquired in the group information acquisition sensor and the two card information acquisition sensors.

Generally, cards of a plurality of decks (4, 6 or 8 decks) are set in the dealing shoe (an electronic shoe) 200 placed on the game table 2. The sets 3*s* of the cards are provided in a state (package 404) in which shuffled cards of a plurality of decks are packaged, the cut card (see FIG. 2) is inserted into the sets 3*s* of the cards of the plurality of decks (4, 6 or 8 decks) for security reasons of the game at the beginning of all games, and when the cut card 3*c* appears, the remaining cards 3*r* in the dealing shoe 200 are not used anymore. All of the remaining cards 3*r* are thrown into the outlet 4 in order to be discarded. The use of the sets of cards (for example, 8 decks) entering the dealing shoe 200 ends, and all of the sets of cards (for example, 8 decks) entering the dealing shoe 200 are stored in the carton 600 for discard through the outlet 4. Then, in order to specify the sets 3*s* of the cards existing in the areas 600A of the carton 600 for discard, the barcodes 403 attached to the packages 404 packaging the sets 3*s* of the cards are inserted into the carton 600 for discard (accurately, areas 600A to be described below). In this case, instead of the barcodes 403, the shuffle card IDs 405 specifying the packages 404 may be separately printed out, and be inserted into the areas 600A of the carton 600 for discard, respectively. When the packages 404 and the barcodes 403 are inserted into the areas 600A of the same carton 600 for discard, wastes are not generated around a casino table, and the discarded packages 404 can be specified, which is advantageous in terms of arrangement.

The packages 404 and the barcodes 403 enter the areas 600A of the carton 600 for discard through slit-shaped card accepting holes 662 formed in the areas 600A of the carton 600 for discard. In this way, the use of the sets of the cards (for example, 8 decks) entering the dealing shoe 200 ends, and all of the sets of the cards (for example, 8 decks) entering the dealing shoe 200 are stored in the areas 600A of the carton 600 for discard, and the barcodes 403 used in order to specify the sets 3*s* of the cards are also accepted in the areas 600A of the same carton 600 for discard. A carton cabinet 601 for discard covering the entirety of the carton 600 for discard may be provided in order to protect the carton 600 for discard.

Each area 600A of the carton 600 for discard has a size enough to sequentially accept the cards 3 distributed from the dealing shoe 200, used in the game, collected, and then discarded by the entire number of cards in one package 404.

When the game is stopped at a predetermined timing (this case will be described below), all of the cards 3 in the dealing shoe 200 and the barcodes 403 are accepted in each area 600A of the carton 600 for discard. The card accepting holes 662 provided in an upper portion of the carton 600 for discard (accurately, an upper portion of each area 600A) and sequentially accepting the discarded cards 3 from the outlet 4 of the game table 2 have a dimension set to be too small to insert a hand from the card accepting holes 662, such that once the cards 3 enter each area 600A, the cards 3 can not be taken out with human hands.

Figure 4:
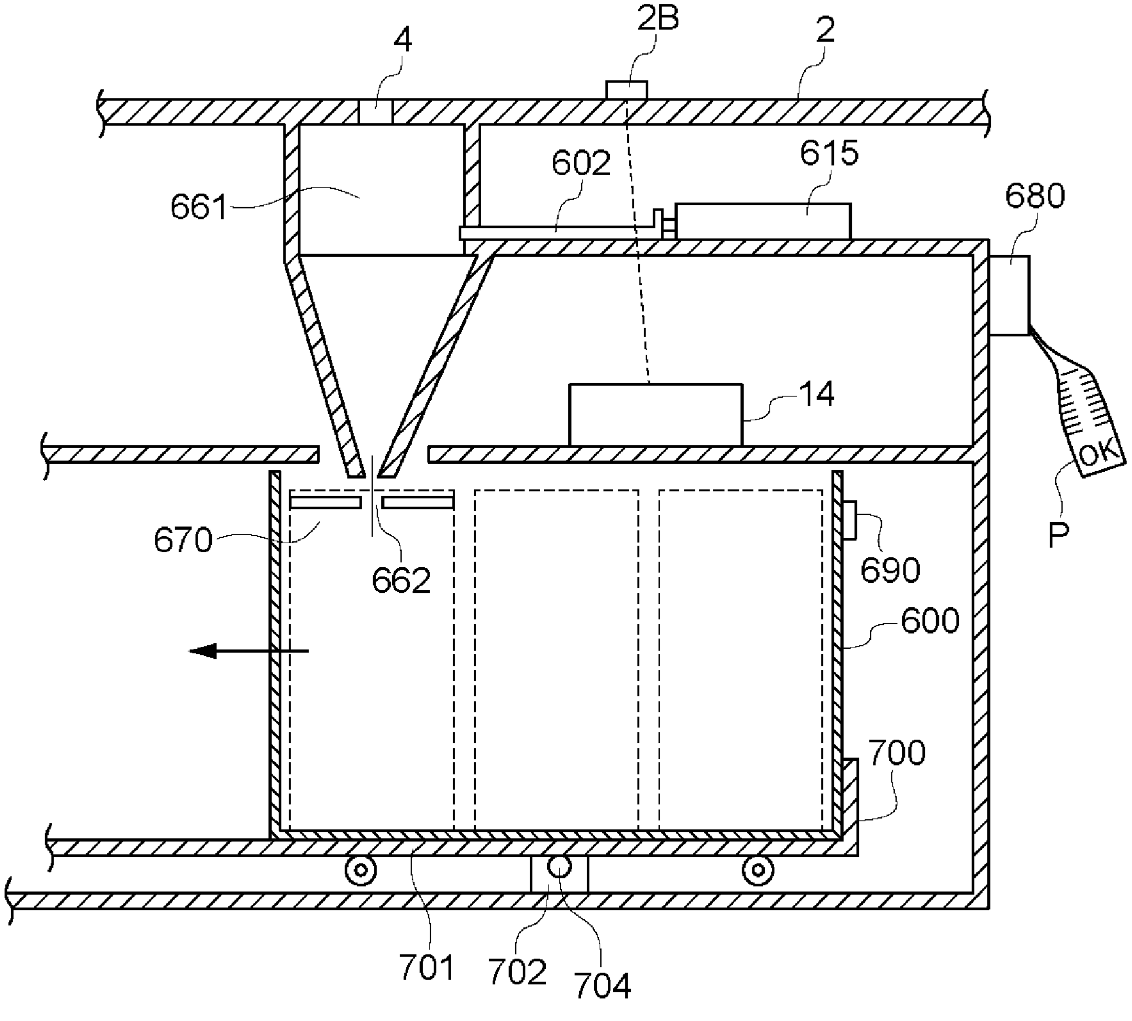
FIG. 4 is a side sectional view of the carton cabinet for discard according to another embodiment of the present invention.

When the game is stopped at a predetermined timing (this case will be described below), all of the cards 3 in the dealing shoe 200 and the barcodes 403 enter each area 600A of the carton 600 for discard, and the carton 600 for discard then moves so that it can accept cards 3 of packages 404 used in the next game. Hereinafter, a structure for accepting the next set of discarded cards 3 from the outlet 4 of the game table 2 in another area 600A will be described with reference to FIG. 4 using an embodiment different from the embodiment described above. A moving apparatus 700 of the carton 600 for discard for accepting the discarded cards 3 in different areas 600A in a unit of packages is provided below the outlet 4 of the game table 2. The moving apparatus 700 is provided with an X-Y table 701 moving the carton 600 for discard in an X-Y direction (shown in FIG. 5), and the carton 600 for discard is mounted and fixed on the X-Y table 701. However, the carton 600 for discard has a structure in which it is detachable from the X-Y table 701 so that it can be moved by a worker in order to discard the cards when nine areas 600A are filled with the cards 3. The X-Y table 701 is provided with ball screws 704 and 705 driven by stepping motors 702 and 703 in order to be moved in the X-Y direction, and the management control apparatus 14 controls positioning of the X-Y table 701 in the X-Y direction through a sequencer (not shown) of the moving apparatus 700.

Next, a movement timing of the X-Y table 701 moving the carton 600 for discard in the X-Y direction (shown in FIG. 5) will be described. In the table game, the game is stopped in order to exchange the packages 404 used in the game at a predetermined timing. The dealing shoe 200 is provided with a function of transmitting a signal for package exchange when one package ends. The management control apparatus 14 transmits a command for moving the carton 600 for discard to the X-Y table 701, when acceptance of the cards 3 corresponding to one package 404 in the area 600A ends.

The management control apparatus 14 issues a command for moving the carton 600 for discard when it receives at least any of the following signals:

(1) a signal transmitted when the ID code reader 100 reads a shuffle card ID 405 attached to a package 404 used in the next game, (2) a signal transmitted when the dealing shoe 200 sets the package 404 used in the next game, and a lid (not shown) of the dealing shoe 200 is closed, and (3) a signal transmitted by manipulating the dealing shoe 200 or other buttons when the package 404 includes the cut card 3*c* for indicating that a new package is used in the next game and all of the cards 3 are removed from the dealing shoe 200 and the game table 2 at a predetermined timing after detection of appearance of the cut card 3*c* by the dealing shoe 200, such that the next game is ready to start.

Alternatively, when a moving button 2B of the area 600A is pressed by a dealer, or the like, a signal is transmitted.

Figure 5:
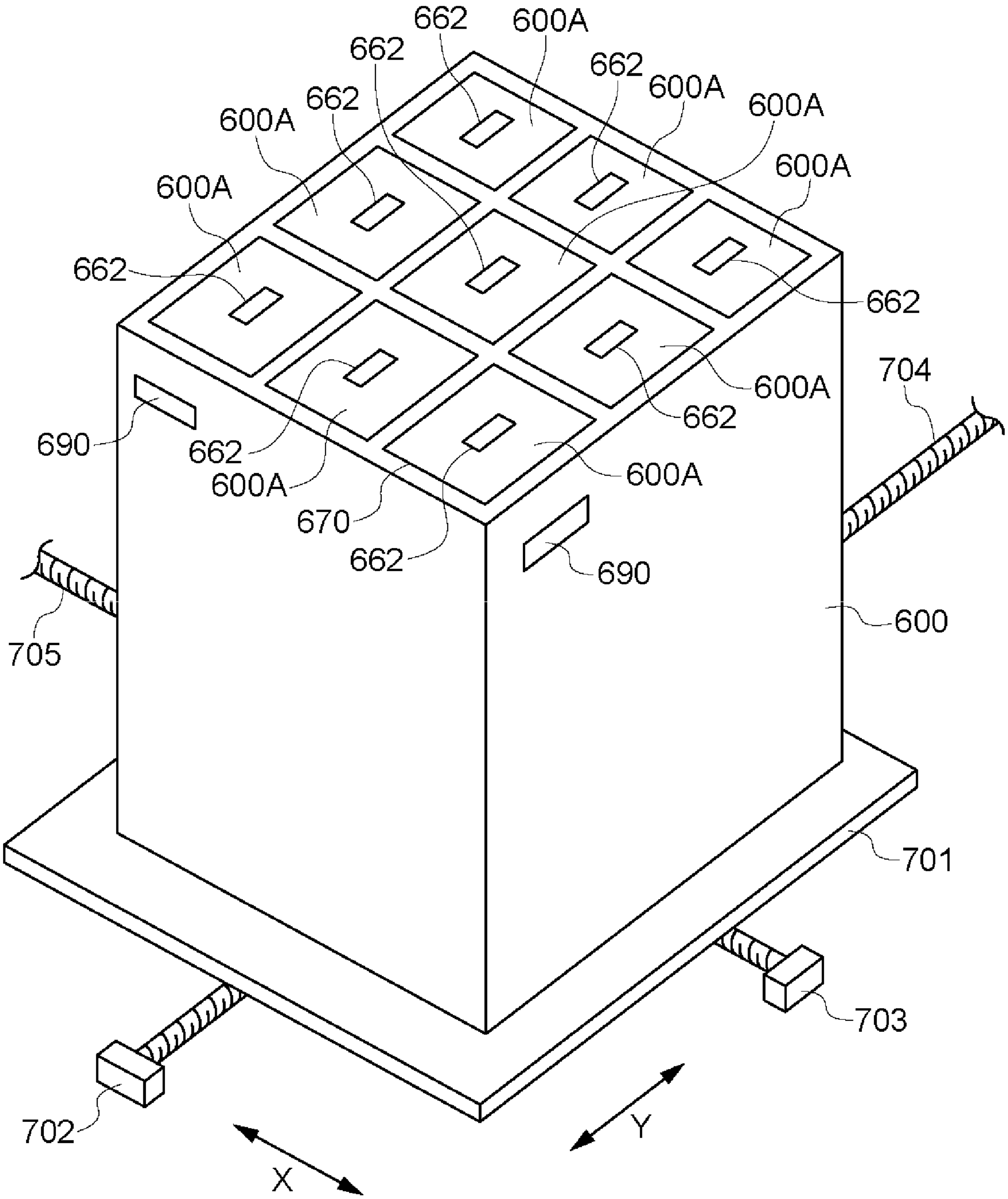
FIG. 5 is a perspective view of a carton cabinet for discard according to another embodiment.

A control for movement of the X-Y table 701 is performed so that at least one of the card accepting holes 662 provided in the upper portion of each area 600A is positioned below the outlet 4 of the game table 2 in a vertical direction, such that the cards 3 certainly enter the area 600A. The management control apparatus 14 moves the carton 600 for discard when it receives the signal for the movement as described above. When the carton 600 for discard first moves in an X direction shown in FIG. 4 and one row of the area 600A becomes full, the management control apparatus 14 issues a command for moving the carton 600 for discard in a Y direction (a direction perpendicular to a paper of FIG. 4). FIG. 5 shows a position relationship in which the carton 600 for discard is mounted on the X-Y table 701 and moves in the X-Y direction together with a position relationship of the outlet 4 of the game table 2.

An opening 661 is formed above the carton cabinet 601 for discard, and a lid 602 is provided so as to open and close the opening 661 manually or automatically (by a driving apparatus 615). The lid 602 is opened and closed to prevent the sets 3*s* of the cards including the discarded cards 3 from falling into the card carton 600 for discard at an unexpected timing during the movement of the carton 600 for discard of the card discarding apparatus 1.

Figure 6A:
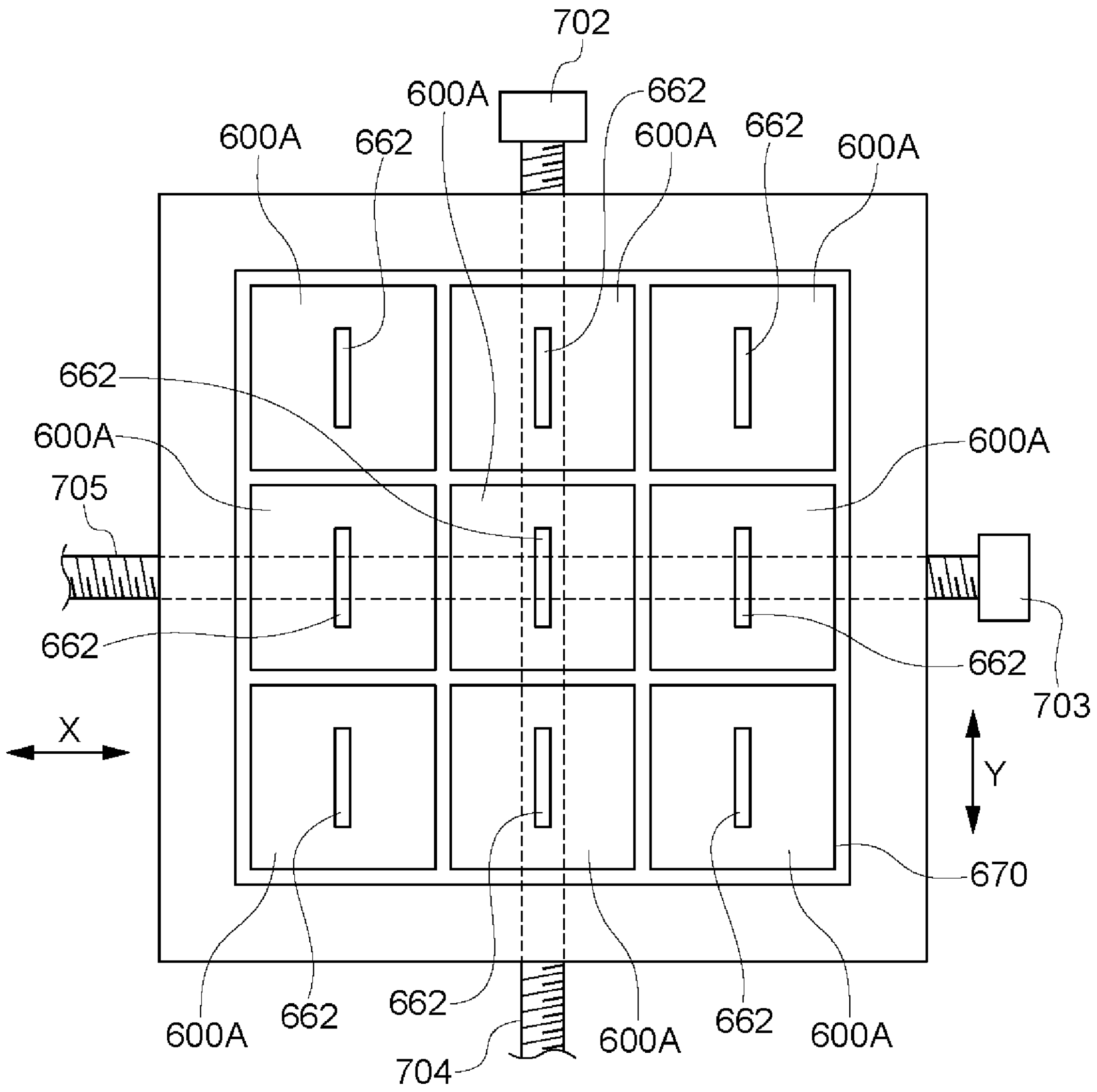
FIG. 6A is a plan view showing a state in which an opening and closing lid is removed in the carton cabinet for discard according to another embodiment.
Figure 6B:
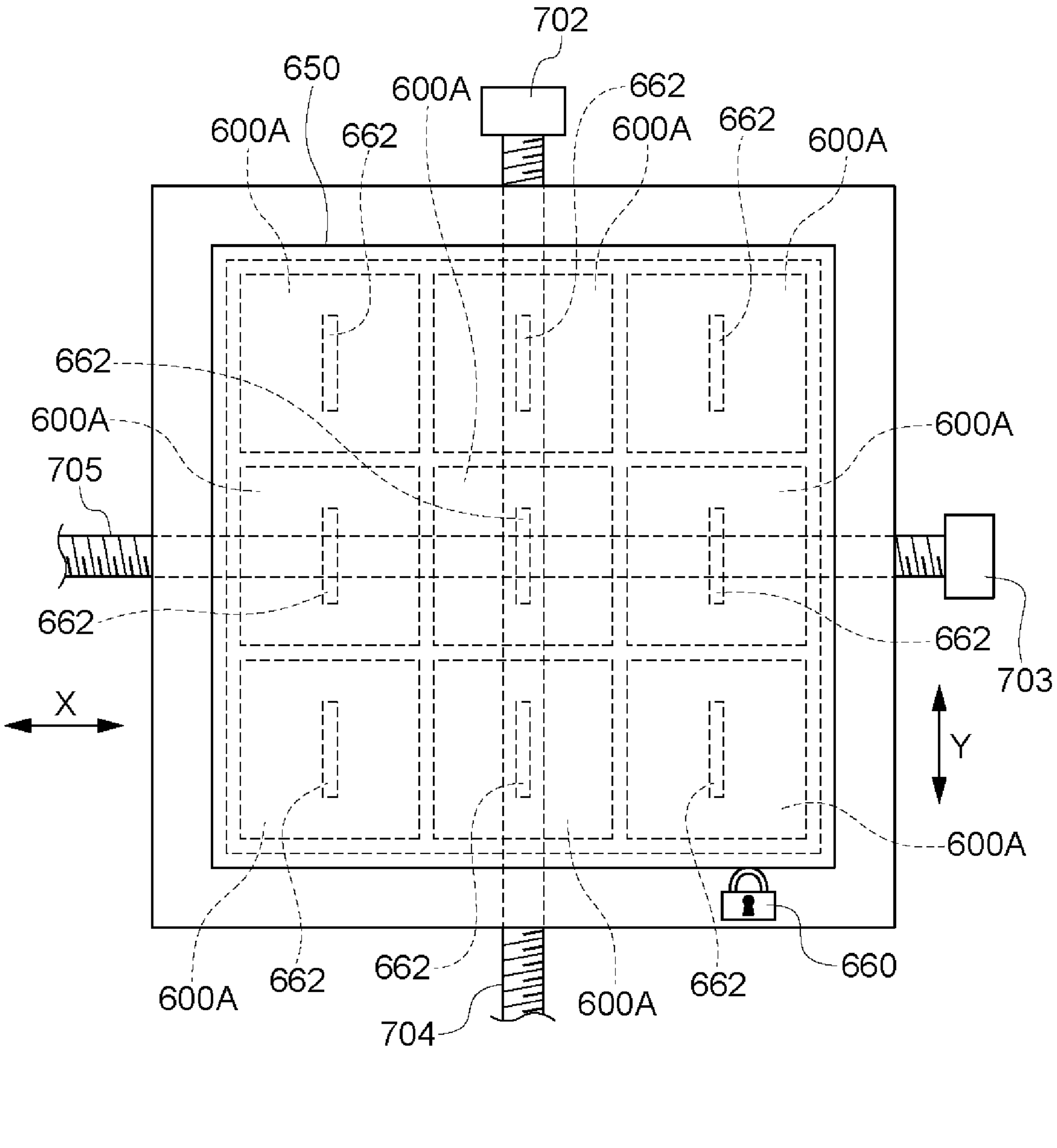
FIG. 6B is a plan view showing a state in which the opening and closing lid is put in the carton cabinet for discard according to another embodiment.

The area 600A of the carton 600 for discard for discarding the collected cards after each game ends is provided in the carton cabinet 601 for discard, but the area 600A of the carton 600 for discard is divided into a plurality of areas in any one or both of longitudinal and transverse directions. The area 600A accepting the cards in the carton 600 for discard are divided into areas of 3×3 in an example shown in FIGS. 5, 6A, and 6B, but may be divided into areas of 1×9, 2×5, or the like, in the longitudinal and transverse directions. The sets 3*s* of the cards including the discarded cards 3 are stored in the areas 600A of the carton 600 for discard through openings 661 on the carton 600 for discard installed directly below the card discarding apparatus 1, such that cards 3 corresponding to nine packages separately enter the area 600A divided into the areas of 3×3, respectively, in a unit of the packages and are stored in a state in which that they are independently managed and discarded for each area 600A.

Figure 7:
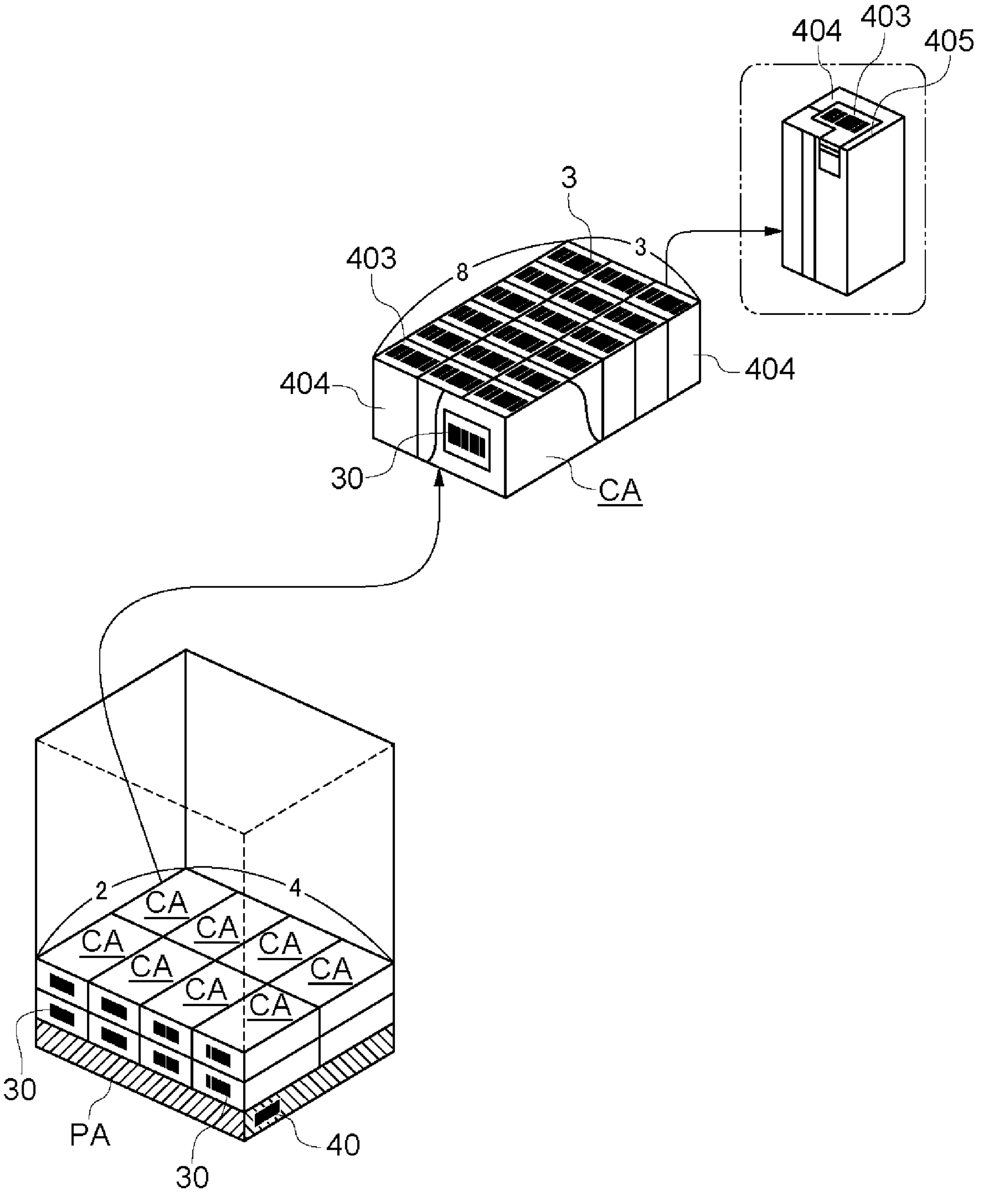
FIG. 7 is a perspective view showing that cards used in the system for managing a table game according to the embodiment of the present invention are carried from a factory to a backyard and a pit of a casino table in a form in which they are stacked in a package, a carton, or a pallet.

Next, a package in which shuffled cards of a predetermined number of decks used in the system for managing the table game according to the present invention are packaged will be described with reference to FIG. 7. The respective shuffle playing cards include a predetermined number of decks (generally, 6, 8, 9 or 10 decks), are shuffled in a random sequence, and are arranged in a unique and random arranging sequence, such that they are packaged to be packages 404 to which uniquely identifiable shuffle IDs 405 (barcodes 403, RFID tags, or the like) are attached in a factory. In this embodiment, the shuffle card IDs 405 are attached to the packages 404 in a form of the barcodes 403 (which may be two-dimensional codes such as QR codes (registered trademark)), a form of the RFID tags, or the like, read by the barcode reader 100 of the dealing shoe 200 or other RFID tag reading means (not shown). The packages 404 are sealed with a sealing material or a shrink packaging material in the factor.

The packages 404 to which the barcodes 403 are attached as unique ID codes are supplied to a backyard of a casino. All of the shuffle card IDs 405 of the packages 404 carried to the backyard are registered in a database (a memory, or the like) of a casino management apparatus 400 (see FIG. 1). All of the shuffle card IDs 405 (the barcodes 403 (which may be the two-dimensional codes such as the QR codes (registered trademark) or may be structures to which RFIDs are attached) of the packages 404 carried to the backyard in this step are registered in order to create a basic database. In order to register all of the shuffle card IDs 405 of the packages 404 supplied to the casino, data from the factory or carton IDs 30 or pallet IDs 40 to be described below may be used instead of reading all of the barcodes 403 of packages 404. The packages 404 may be carried in a state of cartons CA that a predetermined number of packages (for example, eighteen packages) 404 of shuffle playing cards 3 (see FIG. 7) enter from the factory, or the like, (several cartons CA may be placed in a pallet PA). The carton IDs 30 or the pallet IDs 40 may be used in order to register ID codes of the packages 404 carried from the factory to the backyard.

The packages 404 to which the barcodes 403 are attached are stored in the cartons CA while being carried to the casino, and the cartons CA are placed in the pallet PA and stored in the backyard. Different and unique carton IDs 30 are attached to each carton CA, and unique pallet IDs 40 are attached to each palette PA. The carton IDs 30 are registered in advance in the database of the casino management apparatus 400 (see FIG. 1) in association with information on the shuffle card IDs 405 of all of the packages 404 accepted in the cartons CA to which the carton IDs 30 are attached. The pallet IDs 40 are registered in advance in the database of the casino management apparatus 400 in association with the corresponding carton IDs 30 on the pallets PA and the ID codes 4 of the packages 404 stored in the cartons CA. The shuffle card IDs 405 of all of the packages 404 accepted in the cartons CA are associated with the stored carton IDs 30. In addition, the pallet IDs 40 are also associated with the shuffle card IDs 405 of all of the packages 404 on the pallets PA.

Figure 8:
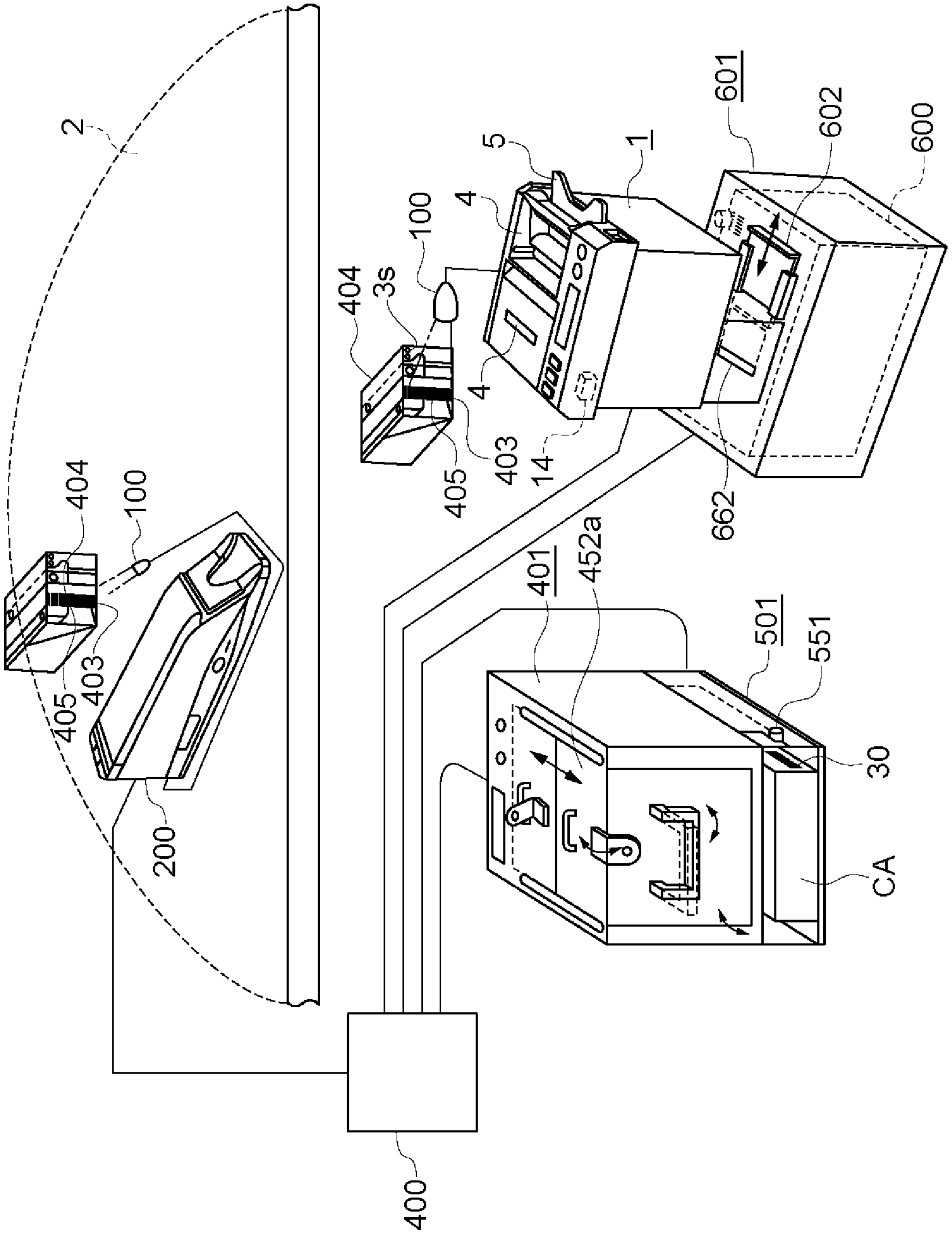
FIG. 8 is an overall perspective view showing the respective portions of the system for managing a table game according to the embodiment of the present invention in detail.

In FIG. 8, the packages 404 are generally carried from the backyard to the game table 2 in a state in which they are stored in the cartons CA, and the cartons CA storing the packages 404 are temporarily stored in a carton cabinet 501 beside the game table. Unopened cartons CA including a plurality of packages (eighteen packages) 404 are stored in the carton cabinet 501. The carton IDs 30 are attached to the cartons CA, and the barcodes 403, the RFID tags, and the like, are always read as the carton IDs 30 attached to the cartons CA and the shuffle card IDs 405 by a plurality of RFID tag reading means 551, barcode readers, and the like, installed in the carton cabinet 501. As described above, the cards 3 are packaged to be the packages 404 to which the barcodes 403, the RFID tags, and the like, are attached as the uniquely identifiable shuffle card IDs 405 in the factory.

In this embodiment, the shuffle card IDs 405 are attached to the packages 404 in a form of the barcodes 403 (which may be two-dimensional codes such as QR codes (registered trademark)), a form of the RFID tags, or the like, read by the RFID tag reading means (not shown). The cartons CA stored in the carton cabinet 501 are taken out from the carton cabinet 501 in order to be used in the next game after all of the packages 404 in a storage box 401 for accepting the packages 404 to be used in the next game are used, and the packages 404 for each carton CA are transferred to the storage box 401 and are used in the game. The shuffle card IDs 405 are attached to the packages 404, and until the packages 404 are taken out from the storage box 401 in order to be used in the game, the shuffle card IDs 405 in the form of RFID tags, or the like, are always read by the plurality of RFID tag reading means 551 installed in the storage box 401, such that unrightful take-out of the packages 404 is monitored.

The system for managing a table game according to the embodiment of the present invention further includes a determining apparatus determining whether or not the game is proceeding correctly. Hereinafter, a determining apparatus at the time of determining abnormity will be described with reference to FIG. 9. The determining apparatus determining whether or not the game is proceeding correctly includes a game monitoring apparatus 811 recording a proceeding state of the game performed on the game table 2, together with a customer (a game participant) and a dealer D, as images through cameras 802 and an image analyzing apparatus 812 analyzing the images of the recoded proceeding state of the game. The dealing shoe 200 is a so-called electronic shoe already used by those skilled in the art, and has a structure in which rules of a game are programmed in advance and win/loss of the game can be determined by reading information (ranks (numbers) and shoots) on the distributed cards 3. For example, in a baccarat game, a banker win, a player win, or a tie (a draw) is basically determined by ranks of two or three cards, and a determination result (a win/loss result) is displayed on a display lamp (not shown).

This determining apparatus further includes an image determining apparatus 814 detecting presence or absence of cards 3 which were drawn out from the dealing shoe 200 by the dealer D and distributed for player 3P and banker 3B on the game table 2, based on an image analysis result by the image analyzing apparatus 812. The detection of the presence or absence of the cards 3 disposed as a hand of a player side or a hand of a banker side in a monitoring area 810 is performed using a technique mainly used as an existing technology by the image analyzing apparatus 812. Two cameras 802 are used in the present embodiment, but are disposed to view the monitoring area 810 at different angles and heights, respectively, such that a blind spot is not present. Two or more cameras 802 may also be used. The detection of the presence or absence of the cards is performed by an image analysis by, for example, colors and contrasts of the cards in the monitoring area 810. However, a structure for detecting the presence or absence of the cards 1 is not limited to the structure based on the image processing as described above, but may be, for example, a sensor, or the like, detecting presence or absence of a specific object using light, or the like. The image analyzing apparatus 812 and the image determining apparatus 814 in the present detecting system have a structure in which they compositely include a computer and a program including one component or a plurality of components, and a memory.

The image determining apparatus 814 detecting the presence or absence of the cards 3 is embedded in the management control apparatus 14, and confirms whether or not all of the cards 3 distributed by the dealer D on the game table 2 are thrown into the outlet 4 of the game table 2 without remaining in the hand of the dealer D and the cards 3 to which distributed for player 3P and the banker 3B are not remain on the game table 2, using the analysis result of the image analyzing apparatus 812. The management control apparatus 14 stores rules of the baccarat game, and when the management control apparatus 14 determines a distribution abnormality of the cards 3 that the rules of the baccarat game are not obeyed or determines a discard abnormality that all of the cards 3 distributed by the dealer D are not thrown into the outlet 4, the management control apparatus 14 has a function of outputting (815) an abnormality determination result to inform a pit manager of the casino or the casino management apparatus 400 of a management department of the abnormality. In addition, the management control apparatus 14 turns on abnormality display lamps (not shown)

provided, respectively, in both of the dealing shoe 200 and the game table 2 when it determines the abnormality as described above, that is, when it detects the abnormality.

As described above, the system for managing a table game includes the game monitoring apparatus 811 monitoring a proceeding situation of the game performed on the game table 2 using the cameras 802, the image analyzing apparatus 812 analyzing the images obtained by the cameras 802, and the image determining apparatus 814 inspecting whether or not the cards are brought to the outlet using the analysis results of the game monitoring apparatus 811 and the image analyzing apparatus 812. The image determining apparatus 814 has a function of determining whether or not the cards 3 distributed from the dealing shoe 200, used in the game, and then collected are brought to the outlet 4 without remaining, determining whether or not the cards 3 remaining without being used are brought to the outlet 4, and determining whether or not the cards 3 remaining on the game table 2 and in the dealing shoe 200 do not exist, using the analysis results of the game monitoring apparatus 811 and the image analyzing apparatus 812, and transmitting an error signal to the management control apparatus 14 and the casino management apparatus 400 at the time of determining an abnormality in each determination. The management control apparatus 14 of the system for managing a table game has a function of storing the "shuffle card IDs 405 and abnormality information", "shuffle card IDs 405 and time when abnormality occurred", or "shuffle card IDs 405 and abnormality information and time when abnormality occurred".

The determining apparatus (the image determining apparatus 814) has a function of transmitting the error signal to the casino management apparatus 400 (through the management control apparatus 14) at the time of determining the abnormality, and the management control apparatus 14 has a function of storing error information in association with the shuffle card IDs 405 of the corresponding packages 404 used in the game when it detects or receives the error signal. The determining apparatus (the image determining apparatus 814) has a function of determining whether or not the cards 3 distributed from the dealing shoe 200, used in the game, and the collected are brought to the outlet 4, determining whether or not the cards 3 remaining without being used are brought to the outlet 4, and determining whether or not the cards 3 remaining on the game table 2 and in the dealing shoe 200 do not exist, using the structure described above, and transmitting the error signal to the management control apparatus 14 at the time of determining the abnormality in each determination.

The system for managing a table game may further include a card number determining apparatus determining whether the number of cards in the set 3*s* of the cards 3 taken out from the package 404 and used in the table game 2 is excessively insufficient or more than expected using determination results from the determining apparatus (the image determining apparatus 814) and the dealing shoe 200. When the number of cards is excessive or deficient, an abnormality is determined, and the management control apparatus 14 may be configured to generate an error signal when the abnormality is determined.

The dealing shoe 200 is a so-called electronic shoe already used by those skilled in the art, and has a structure in which rules of a game are programmed in advance and win/loss of the game can be determined by reading information (ranks (numbers) and shoots) on the distributed cards 1. For example, in the baccarat game, a banker win, a player win, or a tie (a draw) is basically determined by ranks of two or three cards, and a determination result (a win/loss result) is displayed on a display lamp (not shown). In order to end the game and newly start a game, a dealer exchanges the cards 3 in the dealing shoe 200 with a new set. The dealer opens a cover 452*a* on a top surface of the storage box 401, takes out the package 404 in the storage box 401, opens the package 404, take outs a set 3*s* of the cards, and sets the set of the cards 3 in the dealing shoe 200, in order to exchange the cards 3 with the new set. For this reason, the storage box 401 is placed beside the dealer beside the game table 2. Before or after the package 404 taken out in order to be used in the next game is opened, the shuffle card ID 405 is read by the ID code reader (the barcode reader 100 of the dealing shoe 200 (or a reading apparatus 100 of the card discarding apparatus 1)).

After the game ends, when all of the sets of the cards (for example, 8 decks) entering the dealing shoe 200 are stored in the areas 600A of the carton 600 for discard and all of the nine packages 404 are discarded in different areas 600A, respectively, the entire carton 600 for discard is exchanged by the dealer D, the pit manager, or a casino manager, a carton 600 for discard having empty areas 600A is set on the X-Y table 701, and a new game starts. After all of the set 3*s* of the cards 3 packaged in the nine packages 404 are accepted in the areas 600A of the carton 600 for discard, an upper portion of the carton 600 for discard is sealed at the time of movement of the carton.

The card accepting holes 662 of the carton 600 for discard have a slit shape of which a width is narrow so that the discarded cards 3 cannot be taken out, but an opening and closing lid 650 covering the card accepting holes 662 is further provided so as to prevent the cards 3 from being taken out from the carton 600 for discard. Further, the opening and closing lid 650 is provided with a lock 660 so that the cards 3 cannot be taken out, such that it has a structure in which it is locked and is unlocked by a key (not shown). The card accepting holes 662 may be configured to be detachable from an upper opening of the carton 600 for discard. In this case, the upper opening 670 of the carton 600 for discard may be directly covered with the opening and closing lid 650. The opening and closing lid 650 is provided with the lock 660 so that the cards 3 cannot be taken out, such that it may be locked and being unlocked by the key.

Since eighteen packages 404 packaging the sets 3*s* of the cards are packaged in the same carton CA, nine packages 404 are discarded in the carton 600 for discard, the sets 3*s* of the cards packaged in the other nine packages 404 are similarly discarded (drop) in a new carton 600 for discard, all of the sets 3*s* of the cards 3 packaged in the nine packages 404 are accepted in the areas 600A of the carton 600 for discard, and the carton 600 for discard is then similarly sealed (by the lock 660 of the opening and closing lid 650).

In this case, when the carton IDs 30 of the cartons CA in which the packages 404 packaging the sets 3*s* of the cards are packaged are attached to a carton 600 for discard in which first nine packages 404 are accepted and a carton 600 for discard in which last nine packages 404 are accepted by a tape or other means, it is possible to grasp a relationship between the carton IDs 30 of the cartons CA, the packages 404 entering the cartons, and the cartons 600 that are used and are to be discarded. Carton IDs 50 for discard are newly attached to the cartons 600 for discard, and the carton IDs 50 for discard are printed out (print output P) by a print output apparatus 680 according to a command from the management control apparatus 14. The cartons ID 30 of the cartons CA and the carton IDs 50 for discard can be associated with each other, such that both or one of the carton IDs 30 of the used cartons CA and the carton IDs 50 for discard may be attached to the cartons 600 for discard. In another case, a list of the barcodes 403 (the shuffle card IDs 405) attached to all of the packages 404 packaged in the carton CA may also be printed out (print output P) by the print output apparatus 680 according to a command from the management control apparatus 14, and be thus displayed (690) on the carton 600 for discard.

Figure 10A:
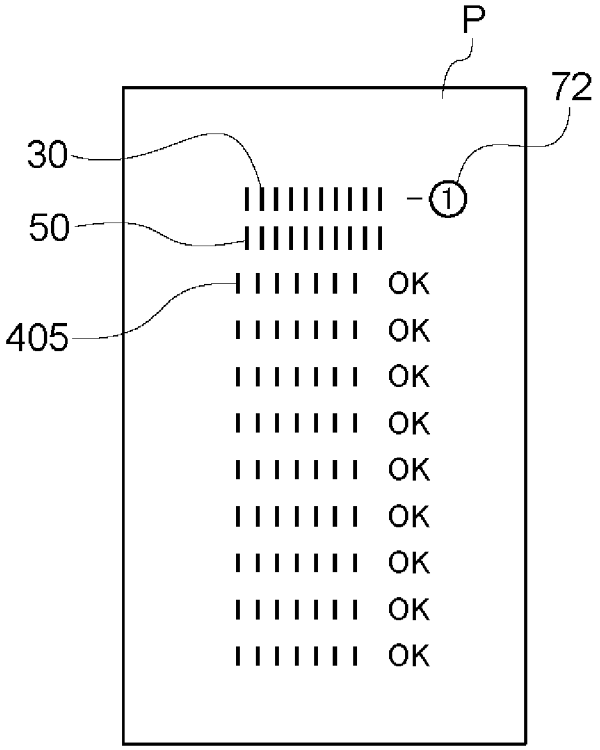
FIG. 10A is a plan view showing an example (normal) of a print output in a carton cabinet for discard according to another embodiment of the present invention.
Figure 10B:
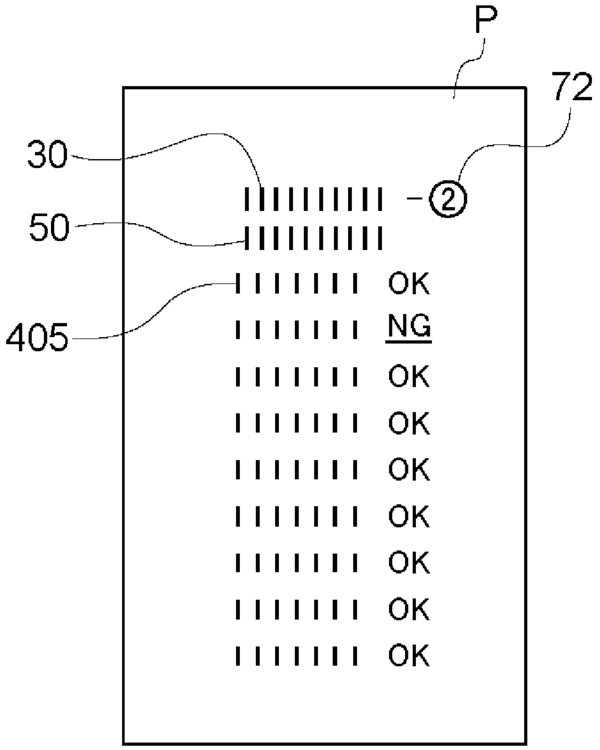
FIG. 10B is a plan view showing an example (abnormal) of a print output in a carton cabinet for discard according to another embodiment of the present invention.

The determining apparatus (the image determining apparatus 814) described above has a function of transmitting the error signal to the casino management apparatus 400 (through the management control apparatus 14) at the time of determining the abnormality, and the management control apparatus 14 has a function of printing out error information in association with the shuffle card IDs 405 of the corresponding packages 404 used in the game when it detects or receives the error signal. Examples of such outputs are shown in FIGS. 10A and 10B. Inspection results ("OK" or "NG") by the card discarding apparatus 1 and the shuffle card IDs 405 of the packages 404 in which the sets 3*s* of the cards 3*a* that are targets to be inspected are packaged may be printed directly on a side surface or other appropriate places of the carton 600 for discard by a laser output, or the like, instead of the print output P. When the printing is directly performed, it is unlikely that a mistake will occur since the dealer D, or the like, needs not attach the print output P to the carton 600 for discard. It is possible to prevent the surrounding peoples from noticing that there is a problem in the inspection result by the card discard apparatus 1. In addition, when a package 404 that is a target of abnormality determination by the determining apparatus (the image determining apparatus 814) is displayed, it is possible to inspect the target package 404 before discard later, which is advantageous in terms of management. Here, an inkjet printer, or the like, can be used as the printer output P.

Figure 9:
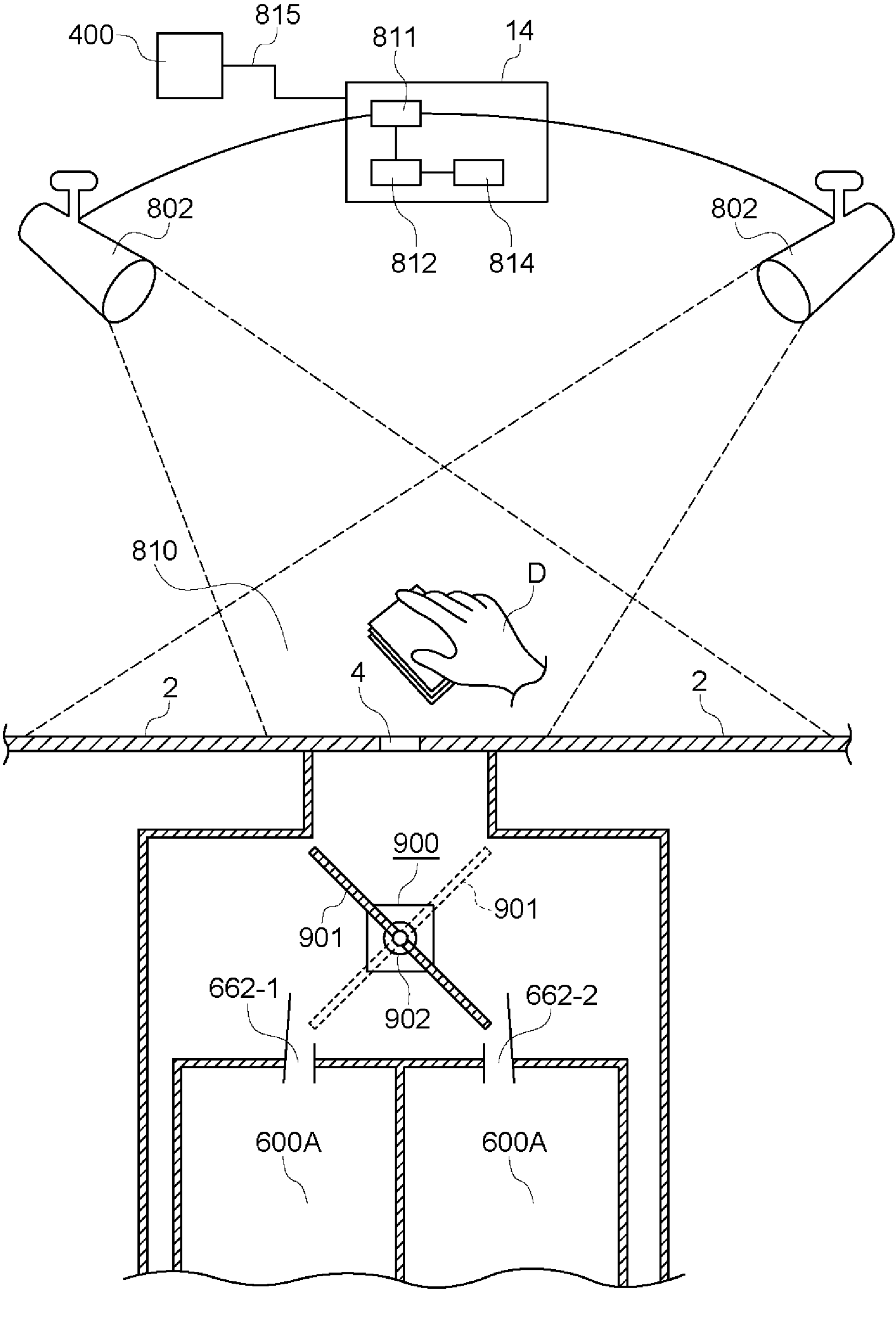
FIG. 9 is a side sectional view of a carton cabinet for discard according to still another embodiment of the present invention.

Next, another embodiment of the present invention will be described with reference to FIG. 9. A configuration in which the game is stopped at the predetermined timing, all the cards 3 in the dealing shoe 200 and the barcodes 403 enter each area 600A of the carton 600 for discard, and the carton 600 for discard then moves so that it can accept the cards 3 of the packages 404 used in the next game is described above, but in another embodiment, a distributing apparatus 900 for accepting the next set of cards 3 discarded from the outlet 4 of the game table 2 in different areas 600A in a unit of the packages 404 is provided above the carton 600 for discard, without moving the carton 600 for discard or together with the movement of the carton 600. The distributing apparatus 900 of the cards 3 for accepting the discarded cards 3 in the different areas 600A in the unit of the package 404 is provided below the outlet 4 of the game table 2. In the distributing apparatus 900, an allocating plate 901 allocating the cards 3 to different card accepting holes 662 of the carton 600 for discard is rotated by a motor 902 to guide the cards 3 to the right and left and allow the cards 3 to fall into different card accepting holes 662-1 and 662-2. The X-Y table 701 may also be provided.

The following functions are portions of the present invention as improvement of an embodiment.

1) The fact that a means (a dealing shoe) obtaining information on at least numbers (ranks) and the numbers of cards of each of several card sets distributed onto the game table in order to be used in each game is provided, and the card discarding apparatus and the dealing shoe are connected to each other through a communication apparatus.

2) Fraud inspection technology of comparing information on ranks of each card of card sets obtained by a card distributing apparatus (the dealing shoe) and information on each of the discarded cards read by the card discarding apparatus with each other and inspecting whether or not the information on the ranks of each card of card sets and the information on each of the discarded cards coincide with each other to inspect abnormalities of the discarded cards in each game.

3) An inspecting means acquiring information on numbers (ranks) from cards placed on the game table and then remaining without being used in each game by a discarded card information acquiring means, summing up information on numbers (ranks) of already obtained cards of each card set used in each game, measuring the numbers of cards per number (rank) of the cards, and determining whether or not all of the cards thrown into the outlet are provided as many as the number of cards corresponding to a predetermined number of decks per number (rank).

While various embodiments of the present invention have been described above, it is to be noted that the abovementioned embodiments can be modified by those skilled in the art without departing from the scope of the present invention. For example, according to the present invention, fraud may be detected in a game other than baccarat game. In this case, the apparatus according to the present embodiment may be appropriately modified if necessary in a game to which it is applied. Structures to be described below are also elements of the present invention.

A system for managing a table game further including a result determining apparatus that determines a win/loss result of each game sent from a dealing shoe and determines whether or not a win/loss result of the game is statistically correct, in which the result determining apparatus has a function of transmitting an error signal to a management control apparatus at the time of determining an abnormality.

In the system for managing a table game, when the determining apparatus determines the abnormality, an error is displayed on the dealing shoe.

In the system for managing a table game, the management control apparatus has a function of storing error information in association with a shuffle card ID of a corresponding package at the time of determining the abnormality.

In the system for managing a table game, a carton ID for discard is attached to the carton for discard and the management control apparatus has a function of storing the carton ID for discard and shuffle card IDs of the respective packages of cards discarded in a corresponding carton for discard in association with each other.

In the system for managing a table game, different and unique carton IDs are attached to each carton for discard and the management control apparatus has a function of storing the carton IDs and shuffle card IDs of all of packages accepted in corresponding cartons in association with each other.

In the system for managing a table game, the management control apparatus has a function of storing the carton IDs and the carton IDs for discard of cartons for discard in which packages taken out from corresponding cartons and used in the game are discarded in association with each other and a function of storing the carton IDs for discard and shuffle card IDs of packages discarded in corresponding cartons for discard in association with each other.

In the system for managing a table game, the determining apparatus further has a function of determining whether the number of packages accepted in the carton for discard is the same as, a half of, or ⅓ of that of packages taken out from the carton and used in the game and has a function of generating an error signal at the time of determining an abnormality.

The system for managing a table game comprising an output apparatus of a carton ID for discard that prints out information on the carton IDs for discard, wherein the information on the carton IDs for discard printed out from the output apparatus of a carton ID for discard is attached to corresponding cartons for discard.

A carton for discard in which printed-out ID information on shuffle card IDs of packages in which cards used in the game and then discarded are packaged is attached to or accepted in the respective areas of the carton for discard or package IDs attached to packages of cards discarded in corresponding areas are cut, and inserted and stored into the respective areas of the carton for discard.

The carton for discard moved by a moving apparatus of the carton for discard for accepting the discarded cards from the outlet of the game table in different areas in a unit of the packages or a distributing apparatus for accepting the discarded cards from the outlet of the game table in different areas in a unit of the packages, such that only cards corresponding to one package are accepted in the respective areas.

REFERENCE SIGNS LIST

1: card discarding apparatus
2: table
3: card
3*c*: cut card
3*s*: set of cards
3*r*: remaining cards
3*a*: card after being used in game
4: outlet
5: discarded card cradle
14: management control apparatus
30: carton ID
40: pallet ID
50: carton ID for discard
100: ID code reader
200: dealing shoe
400: casino management apparatus
401: storage box
403: barcode
404: package
405: shuffle card ID
452*a*: cover
501: carton cabinet
551: ID code reader
600, 600A: carton for discard
601: carton cabinet for discard
602: lid of top surface
615: driving apparatus
650: opening and closing lid
651, 651*a*: ID code reader
652: lid
660: lock
661: opening
662: card accepting hole
670: upper opening
680: print output apparatus
690: display
700: moving apparatus
701: X-Y table
702, 703: stepping motor
704, 705: ball screw
802: camera
810: monitoring area
811: game monitoring apparatus
812: image analyzing apparatus
814: image determining apparatus
815: output
900: distributing apparatus
901: allocating plate
902: motor
CA: carton
PA: pallet

The invention claimed is:

1. A system for managing a table game, comprising:
an ID code reader;
a management controller; and
a carton;
wherein:
the ID code reader is configured to read respective unique shuffle card IDs attached to respective packages in which a predetermined number of respective decks of shuffled cards are packaged;
the management controller is configured to store information on the shuffle card IDs of the packages read by the ID code reader; and
the carton includes a plurality of discard areas that each is structured to accept all cards of the predetermined number of decks of a respective one of the packages after at least some of the cards are (a) distributed onto the game table by a dealing shoe that is configured to accept the cards of the predetermined number of decks taken out from the respective package, (b) used in a game, and (c) then inserted into an outlet of the game table;
the system is configured for the plurality of discard areas to be used sequentially for the acceptance of the cards; and
the management controller is configured to store in association with each other:
(a) the shuffle card IDs of the packages whose cards used in the game are accepted in the carton; and
(b) (i) information on a sequence, on a package basis, in which the cards were accepted in the carton or (ii) addresses of the discard areas in which the cards of the respective packages whose shuffle card IDs were accepted.

2. The system for managing a table game according to claim 1, wherein card accepting holes for sequentially accepting the cards from the outlet of the game table are provided in an upper portion of the carton and have a dimension too small for insertion of a hand into the card accepting holes.

3. The system for managing a table game according to claim 1, further comprising an outlet cover that (a) covers the outlet of the game table, (b) has a slit, and (c) is configured to open the slit when cards need to be inserted through the slit.

4. The system for managing a table game according to claim 1, further comprising a carton mover, wherein the carton mover is configured to move the carton into a plurality of positions at each of which a respective one of the plurality of discard areas of the carton is positioned for acceptance of cards from the outlet of the game table.

5. The system for managing a table game according to claim 1, further comprising a distributor arranged above the carton, wherein the distributor is configured to accept the discarded cards from the outlet of the game table and distribute the cards the distributor has accepted into different ones of the plurality of discard areas as respective units corresponding to the packages.

6. The system for managing a table game according to claim 4, wherein, for each of the packages whose use has ended:

the dealing shoe is configured to transmit a signal for package exchange when the use of the respective package has ended, indicating that acceptance of cards of the respective package in a respective one of the plurality of discard areas ends; and the management controller is configured to responsively perform a control by which the carton moves or a distributor is operated, thereby switching from the respective one of the plurality of discard areas to another one of the plurality of discard areas.

7. The system for managing a table game according to claim 4, wherein the management controller is configured to perform a control by which the carton moves or a distributer for switching between the plurality of discard areas is operated, the control including at least one of:

(1) transmitting a signal when the ID code reader reads a shuffle card ID attached to a package;

(2) transmitting a signal when the dealing shoe sets one of the packages and a lid of the dealing shoe is closed; and (3) transmitting a signal in response to passage of a predetermined time period from when a cut card of one of the packages, which is in use, is reached, the cut card indicating to switch to use of another one of the packages and that all remaining ones of the cards of the in-use one of the packages are to be removed from the dealing shoe and the game table.

8. The system for managing a table game according to claim 1, further comprising an area moving button that, when pressed, causes a signal to be transmitted, in response to which the management controller is configured to apparatus perform a control under which the carton moves or a distributer for switching between the plurality of discard areas is operated.

9. The system for managing a table game according to claim 2, further comprising an opening and closing lid that covers the card accepting holes of the carton, wherein the opening and closing lid is configured to transition by a key between a locked state in which cards in the carton cannot be removed from the carton and an unlocked state in which the cards in the carton can be removed from the carton.

10. The system for managing a table game according to claim 2, wherein:

the card accepting holes are detachable from an upper opening of the carton; and the system for managing a table game further comprises an opening and closing lid that covers the upper opening and that is configured to transition by a key between a locked state in which cards in the carton cannot be removed from the carton and an unlocked state in which the cards in the carton can be removed from the carton.

11. The system for managing a table game according to claim 1, comprising a carton cabinet configured to store the carton.

12. The system for managing a table game according to claim 1, further comprising an ID printer, wherein the ID printer is configured to print out information of the shuffle card IDs, wherein, for each of the plurality of discard areas, the system is configured for attachment, to the respective discard area, of the printed out information of the respective card ID of the respective package whose cards are accepted in the respective discard area.

13. The system for managing a table game according to claim 1, wherein, for each of the plurality of discard areas, the system is configured for a respective package ID attached to a respective one of the packages whose cards are accepted in the respective discard area to be cut from the respective package and inserted into and stored in the respective discard are.

14. The system for managing a table game according to claim 1, wherein a processor of the system is configured to determine an abnormality in a proceeding of the game, and the management controller is configured to store a respective one of the shuffle card ID, which corresponds to one of the packages which was being used at a time of the determination, in association with information and/or the time of the determination of the abnormality.

15. The system for managing a table game according to claim 14, wherein:

the processor is configured to transmit an error signal to the management controller at the time of the determination of the abnormality; and the management controller is configured to store the information of the abnormality in association with the respective shuffle card ID when the management controller receives the error signal.

16. The system for managing a table game according to claim 14, wherein the abnormality includes detection by the dealing shoe and a loss to a casino that is higher than a predefined threshold.

17. The system for managing a table game according to claim 1, wherein the management controller includes at least one processor, the at least one processor being configured to:

analyze images obtained by one or more cameras during the game and thereby determine:

whether the cards that were distributed from the dealing shoe and used in the game are inserted into the outlet;

whether any of cards that were remaining in the dealing shoe without being used in the game are inserted into the outlet; and whether any of the cards that were used in the game and any of the cards that were remaining in the dealing shoe do not exist; and transmit an error signal responsive to determining an abnormality in any of the determination.

18. The system for managing a table game according to claim 17, wherein the one or more cameras includes at least two cameras.

19. The system for managing a table game according to claim 17, wherein the at least one processor is configured to:

determine whether a number of cards taken out from a respective one of the packages and used in the game is excessive or deficient using a result of the analysis; and responsive to a result of the determination regarding the number of cards being that the number of cards is excessive or deficient, generate an error signal.

20. The system for managing a table game according to claim 1, wherein super-area of the carton is divided into the plurality of discard areas in one or both of longitudinal and transverse directions.

21. The system for managing a table game according to claim 1, wherein the plurality of discard areas are arranged in a 1×9, 2×5, or 3×3 formation with respect to longitudinal and transverse directions.

22. The system for managing a table game according to claim 1, wherein at least one processor of the system is configured to:

determine a win/loss result of the game, which is played using the dealing shoe;

determine whether the win/loss result has a statistical abnormality; and transmit an error signal responsive to the statistical abnormality.

23. The system for managing a table game according to claim 14, wherein the system is configured to display an error on the dealing shoe when the abnormality is determined.

24. The system for managing a table game according to claim 1, wherein a processor of the system is configured to determine an abnormality in a proceeding of the game, and the management controller is configured to store error information regarding the abnormality in association with a respective one of the shuffle card IDs, which corresponds to one of the packages which was being used at a time of the determination.

25. The system for managing a table game according to claim 1, wherein a carton ID is attached to the carton, and the management controller is configured to store the carton ID in association with the shuffle card IDs of the packages whose cards are discarded into the carton.

26. The system for managing a table game according to claim 25, wherein the management controller is configured to store respective carton IDs of other cartons in association with respective shuffle card IDs of respective packages whose cards were respectively accepted into the respective other cartons.

27. The system for managing a table game according to claim 1, wherein the management controller is configured to store a carton ID of the carton in association with:

a case ID of a case from which the packages were taken out for use in the game prior to the acceptance of the cards of the packages by the carton;

the shuffle card IDs of the packages whose cards were accepted into the carton.

28. The system for managing a table game according to claim 1, wherein the management controller is configured to:

determine whether a number of the packages whose cards have been accepted into the carton corresponds to a number of packages taken out from a case for use in the game to identify an abnormality; and generate an error signal in response to the abnormality.

29. The system for managing a table game according to claim 1, further comprising a printer, wherein the management controller is configured to print out information regarding the carton using the printer, and the carton is configured for attachment of the printout to the carton.

30. A carton comprising:

an area divided, in one or both of longitudinal and transverse directions, into a plurality of sub-areas that each is structured to accept all cards of a predetermined number of decks of playing cards packaged in a respective one of a plurality of packages after at least some of the cards are (a) distributed onto a game table by a dealing shoe that is configured to accept the cards of the predetermined number of decks taken out from the respective package, (b) used in a game, and (c) then inserted into an outlet of the game table, wherein the plurality of sub-areas are arranged for the sub-areas to be used sequentially for the acceptance of the cards inserted into the outlet of the game table;

card accepting holes via which the cards inserted into the outlet of the game table are accepted into the sub-areas of the carton, wherein the card accepting holes are provided in an upper portion of the carton, and are dimensioned such that they are each too small to insert a hand into the respective card accepting hole.

31. The carton for discard according to claim 30, wherein:

printed-out ID information regarding the packages whose cards are accepted into respective ones of the sub-areas of the carton is attached to or accepted in the respective sub-areas of the carton for discard; or package IDs attached to the packages whose cards are accepted into respective ones of the sub-areas are cut and inserted and stored into the respective sub-areas of the carton.

32. The carton for discard according to claim 30, wherein:

the carton includes or is configured to be coupled to a carton mover; and the carton mover is configured to move the carton into a plurality of positions at each of which a respective one of the plurality of sub-areas of the carton is positioned acceptance of cards from the outlet of the game table.

33. The system for managing a table game according to claim 1, wherein the management controller is configured to store each of the shuffle card IDs of the packages whose cards were accepted into the carton in association with respective information specifying the respective ones of the plurality of discard areas into which the cards of the respective packages are accepted.

* * * * *